United States Patent [19]
Furuya et al.

[11] Patent Number: 5,828,919
[45] Date of Patent: Oct. 27, 1998

[54] CAMERA

[75] Inventors: Hiroaki Furuya; Yasuo Asakura; Yuji Kobayashi, all of Hachioji, Japan

[73] Assignee: Olympus Optical Co., Ltd., Tokyo, Japan

[21] Appl. No.: 835,827

[22] Filed: Apr. 16, 1997

[30]  Foreign Application Priority Data

Apr. 18, 1996 [JP] Japan ..................................... 8-097196
Feb. 4, 1997 [JP] Japan ..................................... 9-021789

[51] Int. Cl.⁶ .................................................. G03B 17/00
[52] U.S. Cl. .......................................... 396/440; 396/535
[58] Field of Search ............................ 396/6, 440, 442, 396/535, 536, 537, 538, 319

[56]  References Cited

U.S. PATENT DOCUMENTS

| | | | |
|---|---|---|---|
| 4,324,476 | 4/1982 | Seely | 396/536 |
| 4,855,774 | 8/1989 | Ohmura et al. | 396/6 |
| 5,307,100 | 4/1994 | Kubo | 396/319 |
| 5,473,401 | 12/1995 | Tsunefuji | 396/536 |
| 5,517,266 | 5/1996 | Funaki et al. | 396/319 |
| 5,600,385 | 2/1997 | Takeshita | 396/319 |
| 5,608,481 | 3/1997 | Nishimura | 396/440 |

*Primary Examiner*—David M. Gray
*Attorney, Agent, or Firm*—Louis Weinstein

[57]  ABSTRACT

A camera which allows a film cartridge to be loaded in the direction of the axis of rotation of the film cartridge or in the direction approximately perpendicular to the axis of rotation, includes a camera body includes a film cartridge compartment for accommodating the film cartridge, a film take-up spool compartment for taking up a film and a film transport path, formed between both compartments, having a film frame aperture, and a shading cover, when assembled to the camera body, for shading the film cartridge compartment, the film take-up spool compartment, and the film transport path.

12 Claims, 9 Drawing Sheets

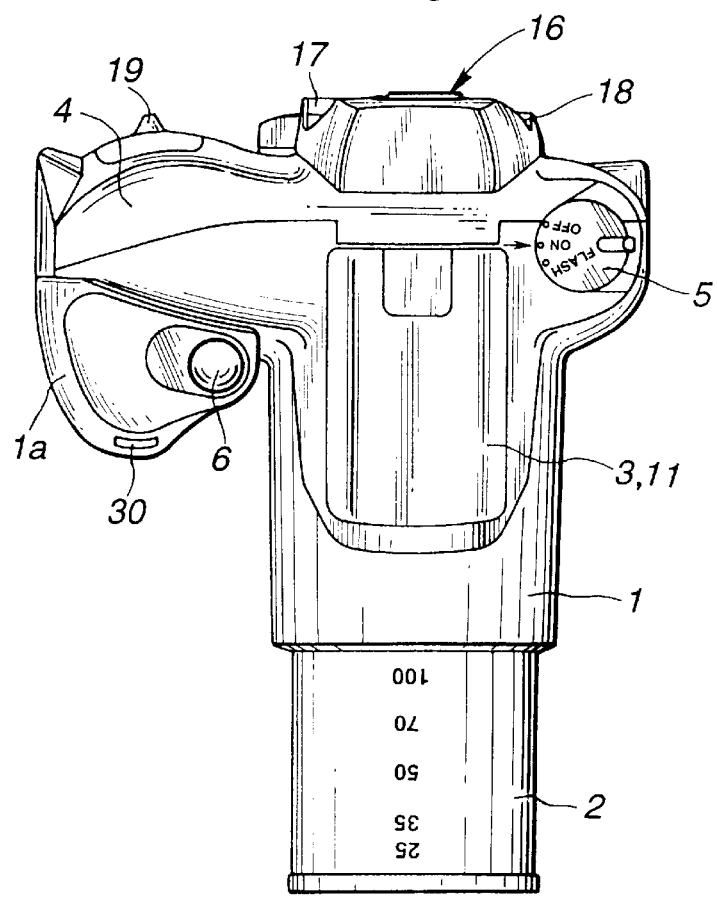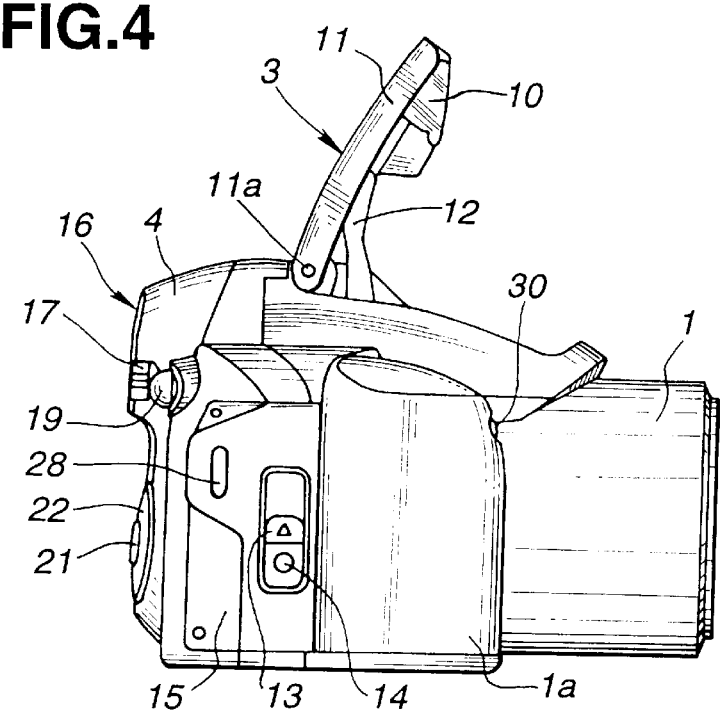

CAMERA

BACKGROUND OF THE INVENTION

1. Field of the Invention

The present invention relates to a camera and, more particularly, to a camera having a shading member.

2. Related Art Statement

In cameras that use a 135-size film magazine or cartridge, some well known types have a large camera back for loading a film and a film pressure plate on the inner surface of the camera back. The film pressure plate presses the film to a predetermined position on an optical axis only when the camera back is closed. Both a cartridge compartment in which a film cartridge is loaded and a take-up spool compartment for taking up the film are together shaded by the camera back.

Some cameras further have an indicator member such as an LCD on the camera back. In such a camera, the film within an aperture is possibly exposed to stray light from the LCD. To preclude such exposure, a shading member has to be arranged around the LCD indicator. This arrangement not only pushes up the cost of the camera but also makes the LCD indicator bulky.

OBJECTS AND SUMMARY OF THE INVENTION

It is a first object of the present invention to provide a compact and low-cost camera which presents an excellent light shading capability.

It is a second object of the present invention to provide a camera, in which a film take-up spool compartment, a film pressure plate and a film cartridge compartment are integrated into a unitary structure.

It is a third object of the present invention to provide a camera that dispenses with a mechanism for pressing a pressure plate against a camera body.

It is a fourth object of the present invention to provide a camera that easily assures the flatness required of the pressure plate.

The camera of the present invention which allows a film cartridge to be loaded in the direction of the axis of rotation of the film cartridge or in the direction approximately perpendicular to the axis of rotation of the film cartridge, comprises: a camera body comprising a film cartridge compartment for accommodating the film cartridge, a film take-up spool compartment for taking up a film and a film transport path, formed between said compartments, having a film frame opening; and a shading cover, when assembled to the camera body, for generally shading the film cartridge compartment, the film take-up spool compartment, and the film transport path.

These objects and advantages of the present invention will become further apparent from the following detailed explanation.

BRIEF DESCRIPTION OF THE DRAWINGS

FIG. 3 is a top view of the camera in the above embodiment.

FIG. 4 is a left-hand side view of the camera in the above embodiment.

DETAILED DESCRIPTION OF THE PREFERRED EMBODIMENTS

Figure 1:
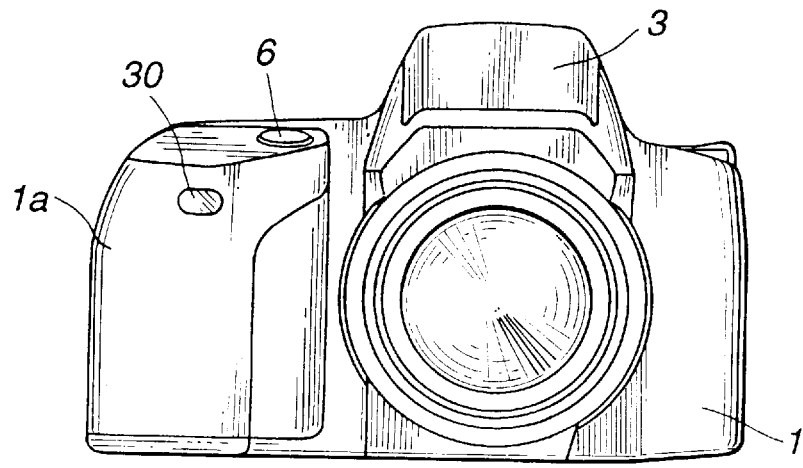
FIG. 1 is an external front view showing a camera according to one embodiment of the present invention.

Referring now to the drawings, the embodiments of the present invention are discussed.

Figure 2:
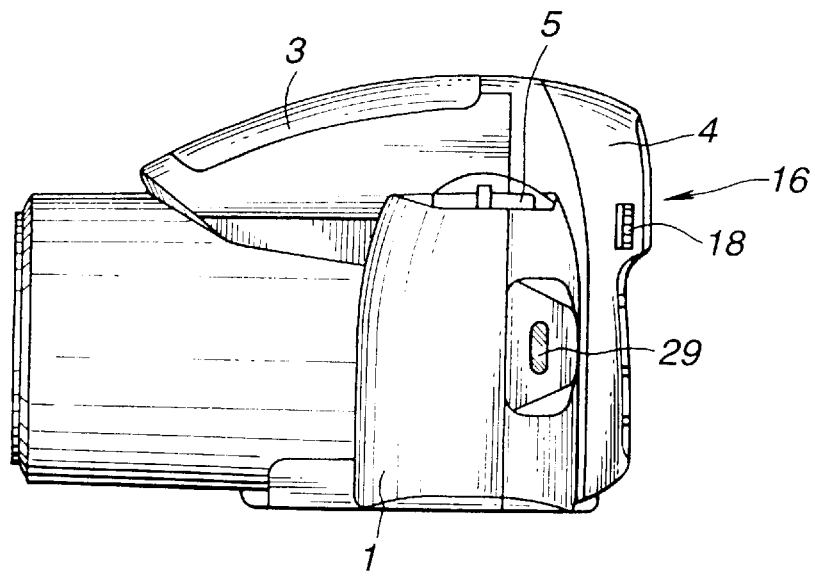
FIG. 2 is a right-hand side view of the camera in the above embodiment.
Figure 5:
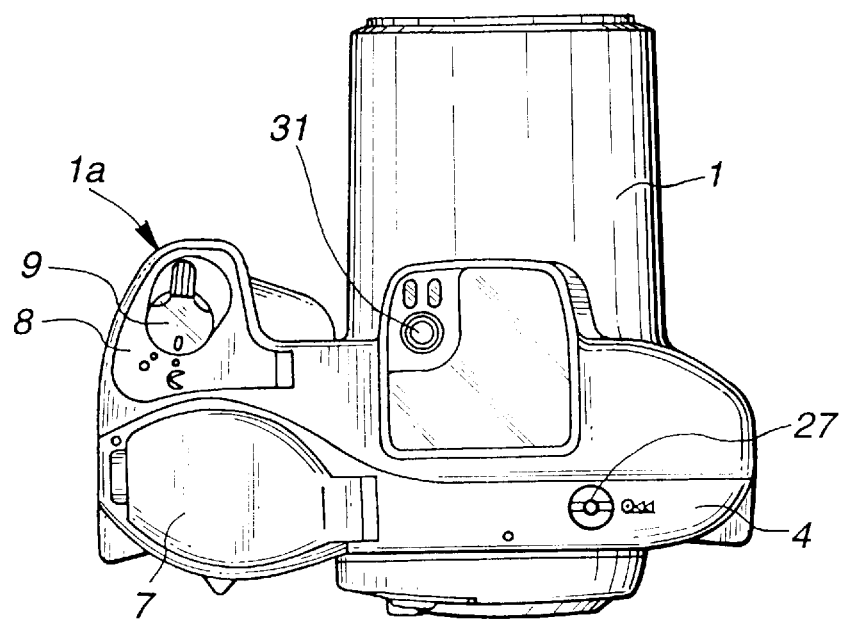
FIG. 5 is a bottom view of the camera in the above embodiment.
Figure 6:
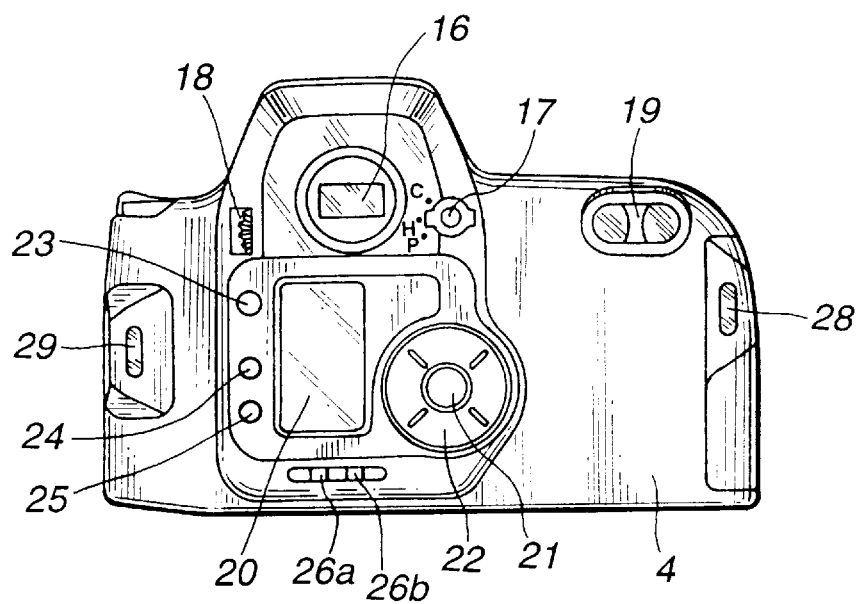
FIG. 6 is a rear view of the camera in the above embodiment.

FIGS. 1 to 6 are external views of one embodiment of a camera of the present invention. FIG. 1 is an external front view of the camera, FIG. 2 is a side view of the camera viewed from the right, FIG. 3 is a top view of the camera with its imaging lens at a telephoto side, FIG. 4 is a side view of the camera with its flash device popped up, viewed from the left, FIG. 5 is a bottom view of the camera, and FIG. 6 is a rear view of the camera.

The camera in this embodiment is the one that complies with the so-called Advanced Photo System. This camera is also an imaging lens integrated single-lens reflex camera in which an imaging lens and a camera body are integrated.

Incorporated as the imaging lens of the camera is a zoom lens with variable magnification which is capable of varying continuously its focal length. Its focal length is variable within a range from 25 mm to 100 mm.

The camera also incorporates a flash device. FIG. 2 shows the flash device in its retracted (closed) state. FIG. 4 shows the flash device at its flashing position (in its popped up state).

The flash device is provided with a popup mechanism, which causes the flash device to be projected (popped up) to its flashing position when additional illumination is required under low-brightness photographing environments.

As shown in FIGS. 1 to 6, the outer covering of the camera is constructed of three blocks, namely, a front cover 1, a rear cover 4 and a flash device 3.

The front cover 1 covering the entire front of the camera has on its approximately central position a cylindrical projection projected frontward to support an imaging lens barrel 2 that holds an imaging lens and the like. The rear cover 4 is engaged with the front cover 1 to close the rear side of the camera.

As already described, this camera complies with the Advanced Photo System, and is not provided with a mechanism that opens and closes the opening arranged on the back of the camera with the camera back cover in such a camera that uses a 135-size cartridge.

Referring to FIG. 4, the flash device 3 is constructed of a flash unit 10 comprising a xenon (Xe) flash tube and a reflector (a reflecting dish), and a flash cover 11. The flash device 3 is pivotally supported about a shaft 11a on the top of the front cover 1. The flash device 3 is allowed to pivot about the pivotal shaft 11a within an angular range of about 80 degrees above the camera top. Two flash arms 12 are respectively arranged on both sides of the flash device 3, and regulates the pivotal motion of the flash device 3 and restrains it to a predetermined position when the flash device 3 is popped up as shown in FIG. 4.

As for the flashing power of the flash unit 10, its beam angle is set up so that the flash device 3 popped as shown in FIG. 4 can illuminate sufficiently the field of view at a minimum distance with an imaging lens at its wideangle side (focal length 25 mm) within a variable focal length range.

The camera has a grip 1a on its left-hand side, viewed from the front, so that the camera can be held by a photographer during photographing. As shown in FIG. 3, a shutter release button 6 is arranged on the front portion of the top of the grip la, operation controls such as a zoom lever 19 are arranged on the upper portion of the rear side of the grip 1a, and a remote control receiver 30 for receiving a signal (infrared rays, for example) from a remote control is arranged on the upper portion of the front side of the grip 1a.

As already described, employed as the imaging lens of the camera is a zoom lens with a zoom ratio of 4, with its focal length ranging from 25 mm to 100 mm. The imaging lens is supported in the imaging lens barrel 2 arranged in the cylindrical projection in the front side of the front cover 1. The imaging lens of this camera is thus fixed inside the body of the camera.

The focal length of the imaging lens is freely varied within the above specified range by manipulating the zoom lever 19. The zoom lens barrel 2 is variably lengthened as the focal length setting is shifted from the short focal length (wideangle) side to the long focal length (telephoto) side (see FIG. 3).

Referring to FIG. 3, a main switch 5, as a power switch of this camera, is arranged near one end of the top surface of the camera (near the right top end of the camera if viewed from the front). The main switch 5 is a dial-like one rotatably supported on the camera top. Available on the main switch 5 is an "OFF" position where power to the camera is cut off, an "ON" position where power to the camera is applied, and a "FLASH" position where the flash device 3 is popped up to its flashing position to be flash-enabled. By turning the main switch 5, the camera may be set to any of these functions.

To retract the flash device 3 to its retracted state (as shown in FIGS. 1 to 3) from its popup state (as shown in FIG. 4), the flash device 3 is manually pressed toward the top of the front cover 1 of the camera as required.

A variety of operation controls are arranged on the rear side of the camera as shown in FIG. 6. Arranged on the roughly central upper portion of the rear side of the camera is an eyepiece section 16 having an eyepiece lens system through which a subject to be photographed is viewed for verification. A diopter scale dial 18 is disposed near one side of the eyepiece section 16 (on the left-hand side if viewed from the back of the camera in FIG. 6) and a screen switching dial 17 is disposed near the other side of the eyepiece section 16 (on the right-hand side if viewed from the back of the camera in FIG. 6).

The screen switching dial 17 is used to select any of three print types available in the Advanced Photo System, namely a standard size H (H-D TV) type with a width-to-height aspect ratio of 16:9, a conventional size C (Classic) type with an aspect ratio of 3:2, and a panorama size P (Panorama) type with an aspect ratio of 3:1. For the standard size, the screen switching dial 17 is set to the H position shown in FIG. 6. For the type C, the screen switching dial 17 is turned clockwise by about 45° to the position C. For the type P, the screen switching dial 17 is turned counter-clockwise by about 45° to the position P. The field of view through the eyepiece section 16 is thus switched in accordance with the print type selected. The screen switching dial 17 is associated with an information recording control circuit (not shown) so that the print type set here is recorded onto a film as part of photographing information during photographing.

Arranged below the eyepiece section 16 is an indicator 20 constructed of a film counter and a liquid crystal display (LCD) for indicating a variety of information including photographing modes. A mode selection button 22 for selecting the photographing mode is arranged in the vicinity of the indicator 20 (on the right-hand side of the indicator 20 if viewed from the back of the camera in FIG. 6). Also arranged in the vicinity of the indicator 20 (on the left-hand side of the indicator 20 if viewed from the back of the camera in FIG. 6) are a flash mode selection button 23 for setting flashing condition, a self/remote control button 24 for setting operational parameters in the remote control and a self timer, and a back-light correction button 25 for correcting exposure during back-light. Each of these buttons 23 to 25 is pressed, for example, to activate one of a variety of modes.

The photographing modes available on the camera through the operation of the mode selection button 22 include four modes (a portrait mode, a landscape mode, a stop action mode (shutter override mode), a night-view mode) besides a standard mode for ordinary photographing. Any of these modes is selected by turning the mode selection button 22 to one of the four directions.

A full-automatic button 21 is arranged in the center of the mode selection button 22. The full-automatic button 21 is used to revert immediately the photographing mode selected by the mode selection button 22 back to the standard mode.

A date format switching button 26a and date setting button 26b are arranged below the indicator 20. The date format switching button 26a is used to select one of date formats available for date of photographing: year, month, day; month, day, year; day, month, year; day, hour, minute; and no recording. The date setting button 26b is used to enter actual numbers for year, month, day, hour and minute. For the selection of date format and date entry, the buttons 26a, 26b are simply pressed.

Arranged on both sides of the camera are strap holes 28, 29 through which straps are fitted to help the photographer carry the camera.

As shown in FIG. 5, a cartridge compartment lid 7 is arranged on the bottom of the cover 4 (on the side of the camera where the grip la is attached) to close an opening through which a cartridge of roll film as a film holder is loaded and removed. The cartridge compartment lid 7 is pivotally supported about an unshown shaft member on the bottom of the rear cover 4. The cartridge compartment lid 7 is allowed to pivot about the pivotal shaft member downward within an angular range of about 100° on the bottom of the camera.

By sliding a cartridge control lever 13 (shown in FIG. 4) arranged on the side of the grip 1a, the cartridge compartment lid 7 is unlocked from its locked state. Disposed on the center of the cartridge control lever 13 is a lock button 14 to prevent the lever 13 from inadvertently unlocking the cartridge compartment lid 7. Specifically, the cartridge control lever 13 can be slid to unlock the cartridge compartment lid 7 to its open state only when the lock button 14 is pressed by a force above a predetermined pressure. A lever cover 15 is arranged in the vicinity of the cartridge control lever 13 to protect it.

This camera employs a so-called drop-in loading method, in which a cartridge containing a roll of film is simply inserted with the cartridge compartment lid 7 opened, and then the lid 7 is pivoted to its closed position.

Arranged on the bottom of the front cover 1 of the camera as shown in FIG. 5 is a battery lid 8 for covering the opening through which a battery power source (two units of lithium batteries, for example) for powering the camera is inserted. More particularly, the battery lid 8 is on the bottom of the front cover 1, namely, the bottom of the grip 1a in the vicinity of the cartridge compartment lid 7. The battery lid 8 is pivotally supported by an unshown shaft member on the bottom of the front cover 1. The battery lid 8 is allowed to pivot downward about the shaft member within an angular range of about 100° on the bottom of the camera.

The battery lid 8 is provided with a control lever 9 to open and close the battery lid 8, and by turning the control lever 9, the battery lid 8 is released from its locked state.

In the state shown in FIG. 5, the control lever 9 is at its unlocked position, where the battery lid 8 is unlocked and ready to be opened. By turning the control lever 9 clockwise from the state shown in FIG. 5, the battery lid 8 is locked to the front cover 1.

Provided on the bottom near the far end of the camera is a stop and rewind button 27 for stopping the camera, for example, in the middle of photographing, and then rewinding the photographed portion of the film. The camera also has on a roughly center front area of the bottom a threaded tripod socket 31 into which a tripod is screwed to hold the camera.

Figure 7:
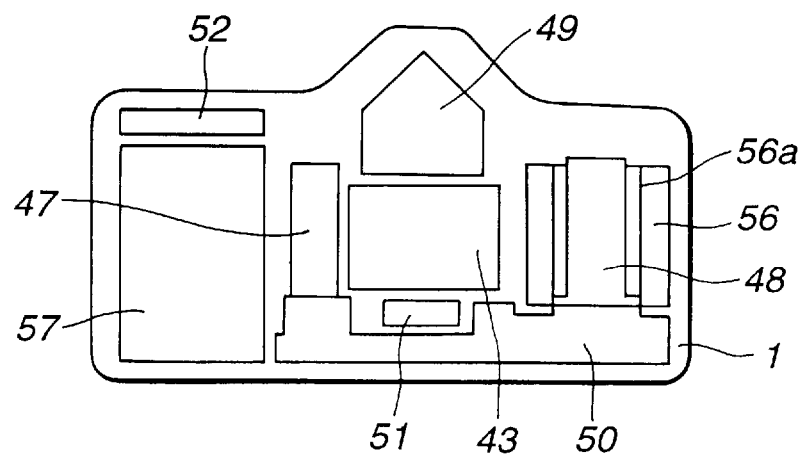
FIG. 7 is a diagrammatic internal front view showing the layout of internal units of the camera in the above embodiment.
Figure 8:
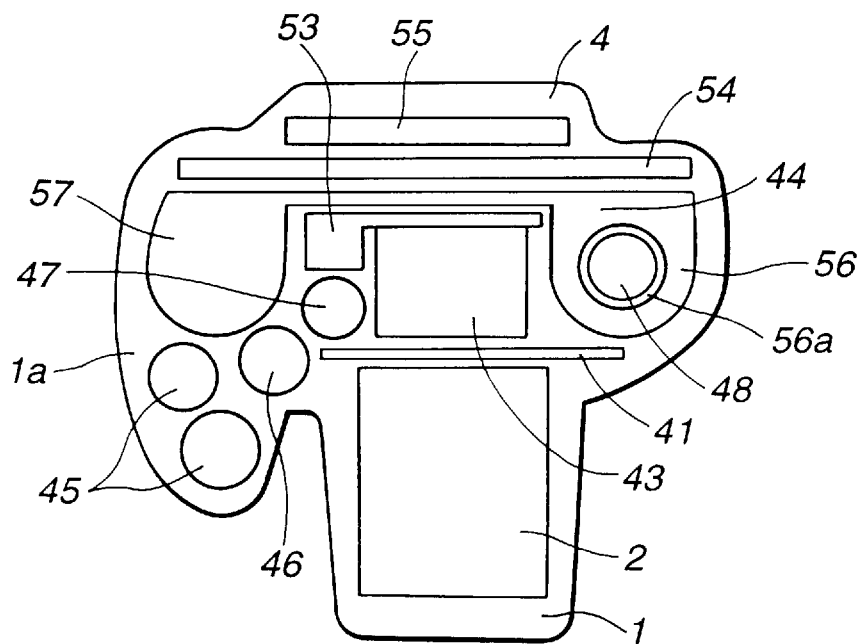
FIG. 8 is a diagrammatic internal top view showing the layout of the internal units of the camera in the above embodiment.

Referring to FIGS. 7 and 8, internal units of the camera according to the above embodiment are now discussed.

FIG. 7 is a diagrammatic internal front view showing internal units of the camera in the above embodiment, and FIG. 8 is a diagrammatic internal top view showing the internal units of the camera. For simplicity, FIGS. 7 and 8 show only roughly the layout of the internal units with no detail provided.

As already described, this camera is an imaging lens integrated single-lens reflex camera in which an imaging lens and a camera body are integrated. As shown in FIG. 8, the imaging lens is held in the imaging lens barrel 2 within the cylindrical projection arranged on the front of the front cover 1.

As shown in FIGS. 7 and 8, the camera has roughly in its center a mirror box 43 comprising a quick-return mirror and the like employed in a typical single-lens reflex camera.

Arranged below the mirror box 43 is an auto-focus (AF) sensor unit 51 for controlling rangefinding.

Arranged above the mirror box 43 is a viewfinder unit 49 comprising a focusing screen, a roof pentaprism and the like. A light beam from a subject introduced into the imaging lens is guided to the eyepiece section 16 via the eyepiece lens system (not shown).

A shutter unit 53 comprising a typical focal-plane shutter is arranged behind the mirror box 43 to perform exposure control. A first camera body 44 constituting the camera body is disposed behind the shutter unit 53. An exposure opening (not shown) is provided in a roughly central portion of the first camera body 44 to admit the subject light beam to a film plane.

A film cartridge compartment 57 is provided in one end portion of the first camera body 44 (on the side of the grip la as shown in FIG. 8). A film take-up spool compartment 56 is provided in the other end portion of the first camera body 44. A spool 56a as a first driven member is rotatably supported in the center of the film take-up spool compartment 56. A film transport path is formed closely along the exposure opening between the film cartridge compartment 57 and the spool compartment 56.

The cartridge compartment 57 of the first camera body 44 is arranged behind the grip la, and correspondingly positioned in alignment with the cartridge compartment lid 7 described with reference to FIG. 5.

Arranged further behind the first camera body 44 is a second camera body 54 as a cover member. The second camera body 54 shades the spacing extending from the cartridge compartment 57 to the spool compartment 56. The second camera body 54, with its pressure plate (not shown), dimensionally defines the film transport path in the vicinity of the exposure opening, and assures required flatness of the film.

The pressure plate (not shown) in the camera is fabricated of resin. Typically, semi-spherical projections are formed on the surface of the pressure plate to achieve a required dimension, and the pressure plate is integrally formed with the second camera body 54.

Arranged in front of the cartridge compartment 57 in the grip 1a are two batteries 45 and a flashing capacitor 46.

As shown in FIG. 8, a body plate 41 is placed between the mirror box 43 and the imaging lens barrel 2. The body plate 41 is fabricated of a sheet metal such as about 1 mm thick stainless steel sheet, and imparts an extremely large mechanical strength and high flatness to other units. The imaging lens barrel 2 and the mirror box 43 are directly fixed to the body plate 41, and the internal units in the camera are designed to be held by the body plate 41.

Outer covering members such as the front cover 1 are connected to the body plate 41 with screws. In this way, the internal units are rigidly held by a mechanically strong member such as the body plate 41 while the first camera body 44 and second camera body 54 are kept from directly touching the outer covering members. The above arrangement effectively precludes internal strain which could arise from the deformation of the outer covering members such as the front cover 1 in response to an external shock or force or which could arise from the assembling of the outer covering members.

The camera employs four major driving motor systems: a mirror/shutter motor 47, a film transport motor 48, an AF motor (not shown), and AV motor (not shown).

The mirror/shutter motor 47 controls the up/down motion of the quick-return mirror and the charging of the focal-plane shutter. The film transport motor 48 performs general transport operation of the film and zooming operation of the imaging lens. The AF motor (not shown) is mounted inside the imaging lens barrel 2, and controls focusing operation. The AV motor (not shown) controls aperture.

The mirror/shutter motor 47 and film transport motor 48 are arranged on the camera body side, and are supported by a motor base plate 50 as shown in FIG. 7. These components constitute a motor unit. The motor unit is inserted from below the camera, and fixed to the mirror box 43 and first camera body 44 and thus the motor unit is mounted at a predetermined position inside the camera.

Referring to FIGS. 7 and 8, the mirror/shutter motor 47 is compactly arranged in a space surrounded by (the driver and control section of) the shutter unit 53, the flashing capacitor 46, and the mirror box 43. The film transport motor 48 is arranged in the spool 56a within the spool compartment 56.

As shown in FIG. 7, a one-way clutch unit 52 is mounted in the upper portion of the grip 1a. As shown in FIG. 8, arranged in the rearmost portion of the camera is a circuit board 55 bearing a circuit linked with a variety of operation controls attached on the camera back.

The internal construction of the above embodiment of the camera is now discussed in detail.

Figure 9:
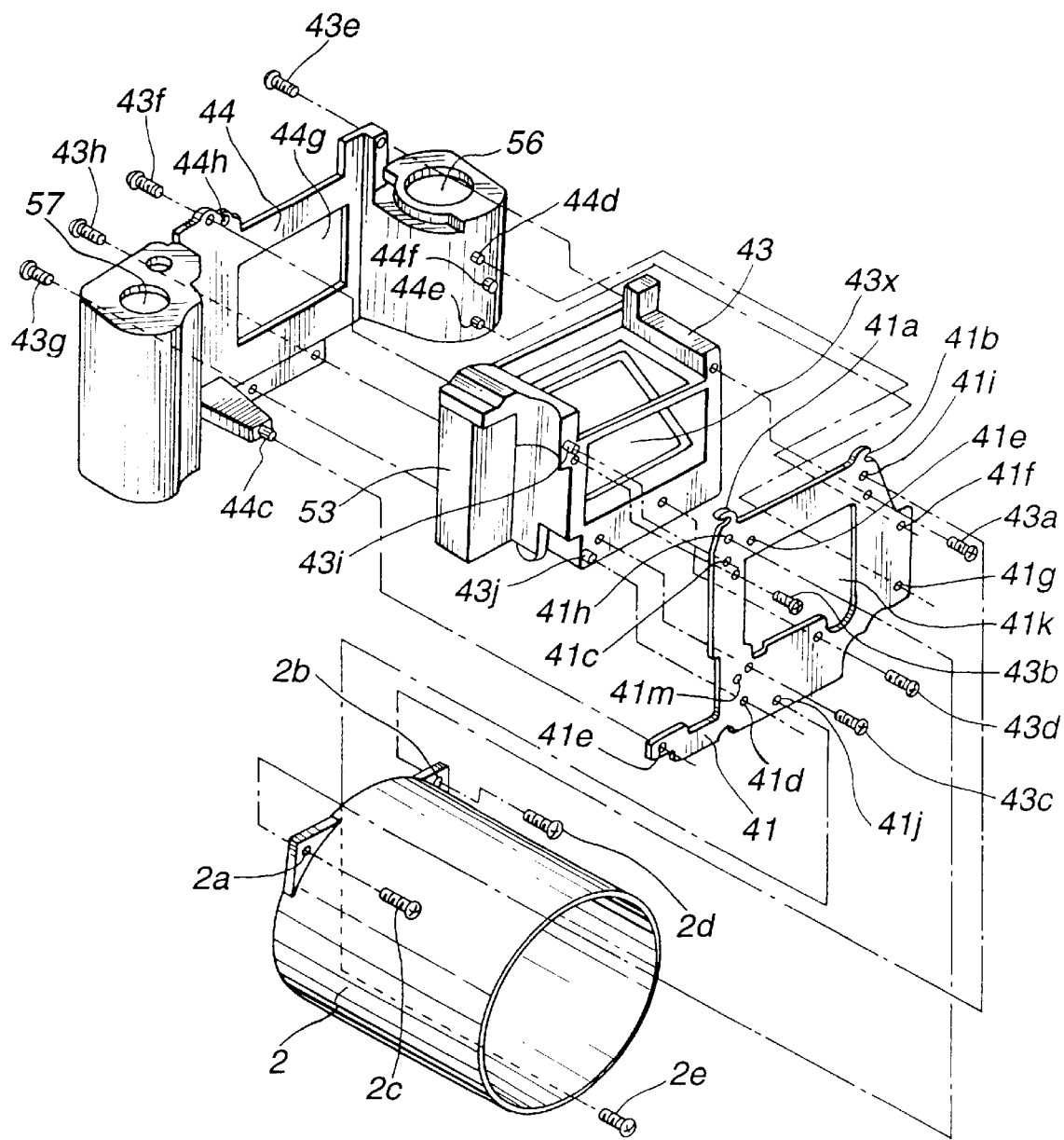
FIG. 9 is an exploded perspective view showing major units of the camera in the above embodiment.

Referring to FIG. 9, major units near the body plate 41 are discussed.

FIG. 9 is an exploded perspective view showing major units (i.e., the first camera body 44, mirror box 43, imaging lens barrel 2) in the vicinity of the body plate 41 in the camera in the above embodiment.

As shown, the body plate 41 has in its roughly center an opening 41k that transmits a subject light beam from the imaging lens. The frame of the opening 41k serves as a mount for various units, for example, the first camera body 44, mirror box 43, and imaging lens barrel 2.

As already described, the body plate 41 is fabricated of a sheet metal such as about 1 mm thick stainless steel sheet, and to gain a high degree of flatness, the body plate 41 is not subjected to processes such as drawing and bending.

The mirror box 43 contains a typical quick-return mirror 43x, which is driven for up/down motion by a driver system (not shown in FIG. 9) comprising the mirror/shutter motor 47.

The body plate 41 is so designed that the mirror box 43 is directly secured on to the body plate 41. More particularly, registering bosses 43i, 43j formed on the front side of the mirror box 43 are received in holes 41c, 41d formed in the body plate 41 so that the mirror box 43 registers with the body plate 41.

The body plate 41 and mirror box 43 are rigidly connected at four points with four respective self-tapping screws 43a, 43b, 43c and 43d. The four self-tapping screws 43a, 43b, 43c and 43d meet the frame portion of the box structure of the mirror box 43 which continuously solidly runs in the direction of the optical path of the camera. This frame portion of the mirror box 43 is mechanically strong enough particularly in the direction of the optical path.

The shutter unit 53 comprising the typical focal-plane shutter is arranged behind the mirror box 43. The shutter unit 53 is also bolted to the mirror box 43 from behind with screws (not shown).

The first camera body 44 is arranged further deeper behind the mirror box 43. As described above, the first camera body 44 is provided with the exposure aperture 44g that defines the frame size of image of the camera. As already described, the film cartridge compartment 57 is provided in one end portion of the first camera body 44. The film cartridge compartment 57 accommodates a cartridge that is inserted through the opening, which is opened and closed by the cartridge compartment lid 7, in the bottom of the camera in the drop-in loading method. The film take-up spool compartment 56 is integrally formed with the first camera body 44 in its other end portion and arranged inside the film take-up spool compartment 56 is the spool (designated 56a in FIGS. 7 and 8, and not shown in FIG. 9) for taking up a roll of film that is paid out and exposed during a photography operation.

The first camera body 44 is rigidly attached to the mirror box 43 in the same way as the body plate 41 is attached to the mirror box 43. More particularly, two registering bosses (not shown) secured onto the rear side of the mirror box 43 are received in two holes (FIG. 9 shows only one designated 44h) formed in the first camera body 44 so that the first camera body 44 registers with the body plate 44. The first camera body 44 and the mirror box 43 are rigidly connected at four points with four respective self-tapping screws 43e, 43f, 43g, and 43h.

Each of the above-described units is extremely miniaturized, and the first camera body 44 as a single unit, for example, is subject to deformation. More particularly, the cartridge compartment 57 and spool compartment 56 are subject to deformation in their areas near the exposure opening 44g. To prevent such deformation, the first camera body 44 is provided with three bosses.

More particularly, the first camera body 44 has, on the front side of the spool compartment 56, bosses 44d, 44e, which are received in holes 41f, 41g formed in the body plate 41. With this arrangement, the spool compartment 56, even if slightly deformed, is corrected to a predetermined position and thereafter deformation is precluded.

The cartridge compartment 57 has on its front side a boss 44c, which is received in a hole 41n formed in the body plate 41. With this arrangement, deformation of the first camera body 44 is equally prevented. The boss 44c is longer than the bosses 44d, 44e by about 2 mm, and its end portion is projected out of the front surface of the body plate 41 when the boss 44c is fully inserted into the hole 41e.

In this state, namely, when both the mirror box 43 and the first camera body 44 are directly attached or positioned to the body plate 41, the viewfinder unit 49 (not shown in FIG. 9, see FIG. 7) is arranged above the mirror box 43. The motor unit 50 (not shown) is arranged below the first camera body 44.

The imaging lens barrel 2 is assembled and fixed to the front of body plate 41. The body plate 41 is provided with two registering holes 41e, 41m for the imaging lens barrel 2, which are engaged with registering bosses (not shown) formed on the rear side of the imaging lens barrel 2 so that the imaging lens barrel 2 registers with the body plate 41.

The imaging lens barrel 2 has on its rear end three lug portions (FIG. 9 shows only two lug portions 2a, 2b), each having a through-hole. The body plate 41 has three tapped holes 41h, 41i, and 41j which are in alignment with the respective through-holes. Three screws 2c, 2d, and 2e rigidly secure the imaging lens barrel 2 to the front of body plate 41b.

In this way, the imaging lens barrel 2, mirror box 43, and first camera body 44 are rigidly attached to the body plate 41. The major units, thus integrated into a unitary structure, are connected to the outer covering member (cover members, though FIG. 9 shows none of them) only via the body plate 41.

More specifically, lugs 41a, 41b extended from the top edge of the body plate 41 are engaged with fixing portions formed the inner surface of the outer covering member to secure the outer covering member to the body plate 41. FIG. 9 shows only lugs 41a, 41b out of connection members used between the body plate 41 and the outer covering member, and the description of details of the connection members is omitted.

The major units integrated into a unitary structure are connected to the outer covering member of the camera via the body plate 41 only. This arrangement protects the major units inside the camera from the effect of an external force that may be exerted onto the outer covering member of the camera. The outer covering member is structured as thinly as possible to miniaturize and reduce the weight of the camera itself.

The relationship of the first camera body 44 with the second camera body 54 is now discussed.

Figure 10:
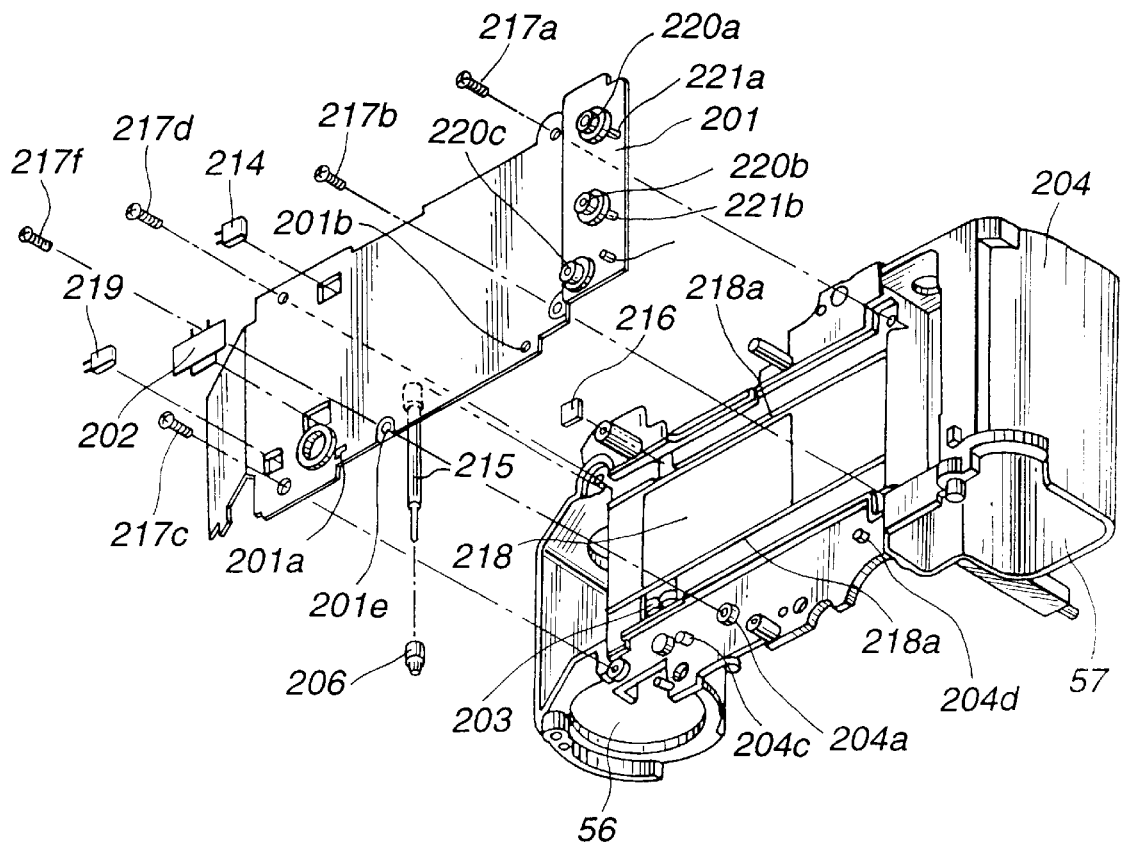
FIG. 10 is an exploded perspective view showing major units of the camera viewed from below in the above embodiment.

FIG. 10 is an exploded perspective of major portions of the camera of the present invention viewed from below. As shown, a first camera body 204 and a second camera body 201 correspond to the first camera body 44 and the second camera body 54, respectively. The motor unit is not shown to clarify the relationship of the first camera body 204 with the second camera body 201. In the actual assembling order, the second camera body 201 is assembled after the unshown motor unit, viewfinder unit, and imaging unit are assembled.

Arranged between the first camera body 204 and the second camera body 201 is a pressure pad 203 that holds a roller shaft 215 and a first camera body roller 206 rotatably supported by the roller 215, as shown. With an unshown spring, the pressure pad 203 urges the film against a magnetic head 202 in the direction toward a photographer. A reflector plate 216 is fixed on the first camera body 204 at a location facing a photoreflector 214, mounted on the second camera body 201, for detecting a perforation in the film, namely for detecting the position of the film.

As described above, the second camera body 201 is so designed that the perforation detecting photoreflector 214 and the magnetic head 202 are mounted thereon. Although FIG. 10 shows simply these devices only, they are soldered to unshown associated control circuit boards in practice.

The first camera body 204 registers with the second camera body 201 with two bosses 204c, 204d formed on the first camera body 204 received in two holes 201a, 201b formed in the second camera body 201, and then both bodies are rigidly connected to each other at four points with four respective self-tapping screws (docking screws) 217a to 217d.

The mounting positions of the four screws are so determined that a sufficient mechanical strength is gained on the first camera body 204 while preventing the deformation of rail sections that define the position of the film in a plane perpendicular to the optical axis in the vicinity of an aperture 218 as a frame of image. With known mating sections constructed of ribs, grooves and steps, the first camera body 204 and second camera body 201 shade the film take-up spool compartment, film transport path and film cartridge compartment.

The second camera body 201 has junction portions 220a, 220b, and 220c for connection with a control circuit board and registering bosses 221a, 221b, and 221c corresponding to these respective junction portions. The functions of these junction portions and registering bosses will be described later.

Figure 11:
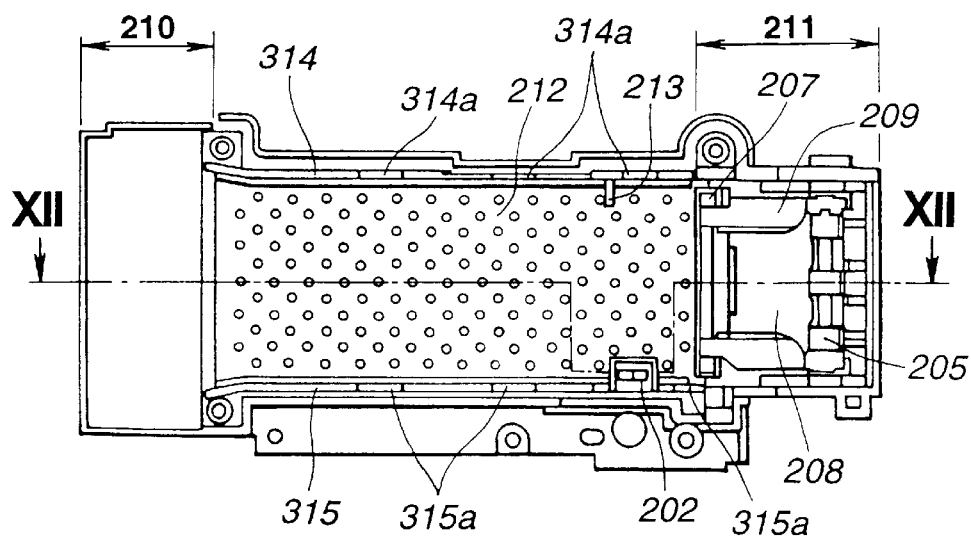
FIG. 11 is a front view of a second camera body of the camera in the above embodiment.

FIG. 11 is a front view of the second camera body 201 of the camera.

As shown, a pressure plate 212 extends over the second camera body 201, and assures the required dimension with the tips of regularly arranged semi-spherical resin projections in the same way as a known pressure plate with resin projections.

Figure 12:
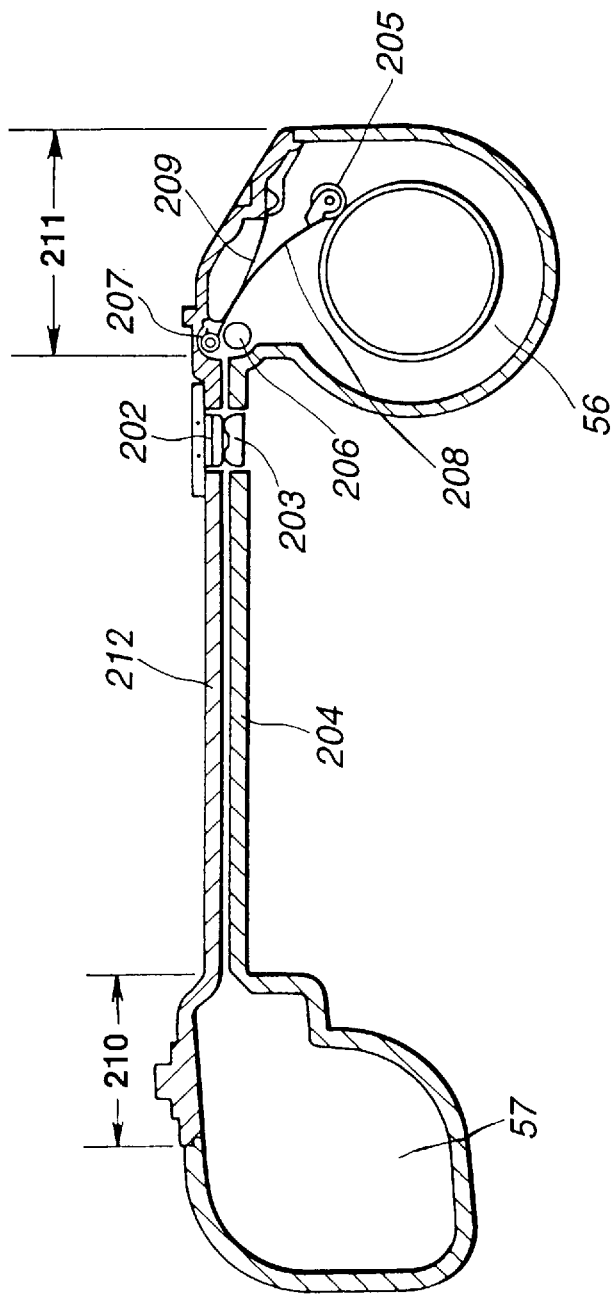
FIG. 12 is a cross-sectional view of first and second camera bodies of the camera in the above embodiment.

FIG. 12 is a cross-sectional view of the first camera body 204 and second camera body 201 taken along a line XII—XII in FIG. 11. Structures not directly related to the spool compartment 56 in the second camera body 201 are omitted in FIG. 12.

The second camera body 201 is constructed of three major blocks, a cartridge compartment cover 210, a spool compartment cover 211, and a pressure plate 212 that extends therebetween as shown in FIG. 12.

Fixed on the spool compartment cover 211 in the second camera body 201 are a first guide plate 208 rotatably supporting a first guide roller 205, and a third guide plate 209 holding a second camera body roller 207. The first guide plate 208 and third guide plate 209 are fabricated of grooved plate springs, and the urging of these springs press the rollers 205, 207 against the spool and the first camera body roller 206, respectively.

The pressure pad 203, under the urging of the already-described spring, presses against the magnetic head 202. With the film being introduced, the pressure pad 203 reliably presses the film against the magnetic head 202.

Returning to FIG. 10, a film following photoreflector 219 is fixed on the second camera body 201 at a location facing the bottom portion below the first camera body roller 206. The bottom portion of the first camera body roller 206 comprises a highly reflective multi-faced prism integrated with the first camera body roller 206.

The operation of these components is now briefly discussed. As already described, the film is urged by the pressure pad 203 against the magnetic head 202, and then by the second camera body roller 207 against the first camera body roller 206. The first camera body roller 206 rotates reliably in synchronization with film transportation. The film following photoreflector 219 detects rotation of the prism portion of the first camera body roller 206 in the form of change in reflected light intensity level. Based on the film speed thus detected, the magnetic head 202 performs magnetic recording at a predetermined density at a predetermined location.

A reflector plate 216 is fixed in alignment with the perforation detecting photoreflector 214, which receives high-level reflected light when a perforation is just past thereof. The movement (transportation) of one frame is thus detected.

Referring to FIGS. 13, 14 and again to FIGS. 10 to 12, the connection of the first camera body 204 to the second camera body 201 is now discussed.

Figure 13:
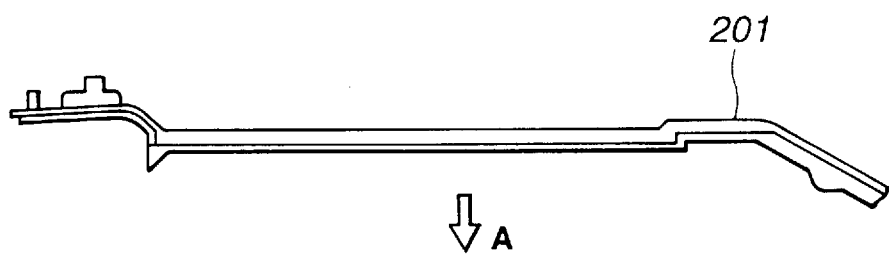
FIG. 13 is a top view showing the direction of the flexure of the second camera body of the camera of the above embodiment.
Figure 14:
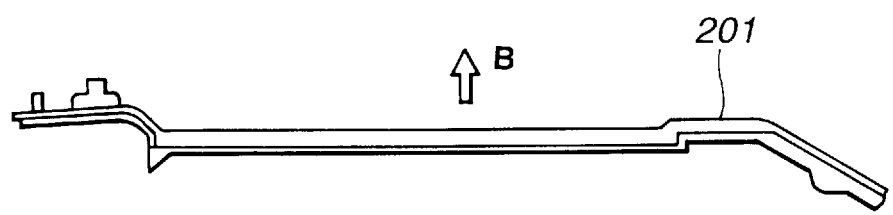
FIG. 14 is a top view showing the direction of the flexure of the second camera body of the camera of the above embodiment.

FIGS. 13 and 14 are both top views of the second camera body 201. As shown in both FIGS. 13 and 14, the upper side represents the rear of the camera, the bottom side represents the front of the camera, and arrows represent the direction of flexure after the formation of the second camera body 201.

As shown in FIG. 11, the second camera body 201 is provided with rail sections 314, 315 that define the position of the film in the direction of width. The rail sections 314, 315 are arranged respectively on the top and bottom ends of the pressure plate 212, and extend between the cartridge compartment cover 210 and the spool compartment cover 211.

The rail sections 314, 315 have respectively three flange portions 314a, 315a projected toward the subject (toward the reader in FIG. 11).

When the pressure plate 212 of the second camera body 201 of resin is slightly flexed at its central portion in a convex shape in the direction of arrow A as shown in FIG. 13, the flange portions 314a, 315a of the second camera body 201 abut the first camera body 204. In this case, the pressure plate 212 is connected, at its four corners, to the first camera body 204 with four respective screws 217a, 217b, 217c, and 217d (see FIG. 10). The flatness required of the pressure plate 212 is thus assured.

Returning to FIG. 10, a screw hole 201e is formed on the pressure plate of the second camera body 201 in its center lower edge portion so that the second camera body 201 is secured to the first camera body 204 with a screw. The first camera body 204 has a self-tapping hole 204a for a self-tapping screw 217f in a location corresponding to the screw hole 201e. Thus, the self-tapping screw 217f secures the first camera body 204 to the second camera body 201.

When the pressure plate 212 of the second camera body 201 of resin is slightly flexed at its central portion in a convex shape in the direction of arrow B as shown in FIG. 14, the screw 217f is used to secure the first camera body 204 to the second camera body 201 so that the flatness of the second camera body 201 is assured.

As described above, the second camera body 201 is fabricated of resin, and further is integrated with the cartridge compartment cover 210, spool compartment cover 211, and pressure plate 212 into a unitary structure. Thus, the flatness of the pressure plate 212 cannot be assured by product molding process only. If required flatness is not achieved, molding tools may be corrected. Correction of the molding tools will involve a substantial cost increase.

The camera of this embodiment has been developed in view of such a problem. According to the technique described above, even if the flatness of the pressure plate even after molding process suffers from a slight degree of flexure, the flexure is corrected during assembling.

Figure 15:
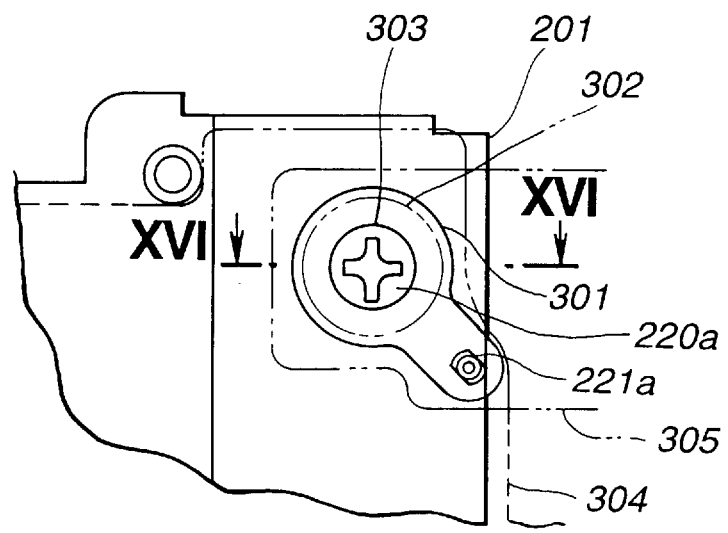
FIG. 15 is a fragmentary enlarged rear view of the second camera body of the camera in the above embodiment.
Figure 16:
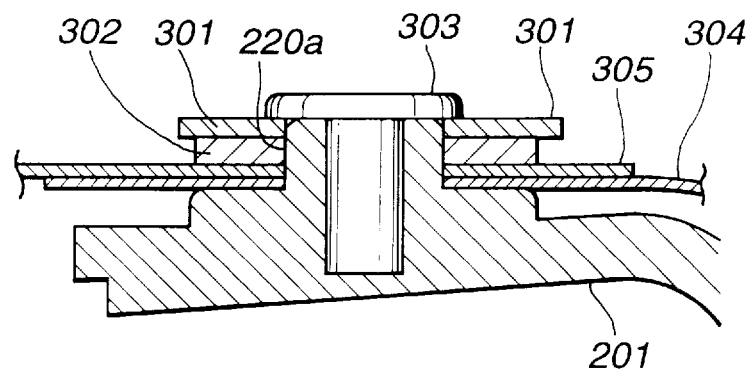
FIG. 16 is a fragmentary cross-sectional view of a portion of the second camera body show in FIG. 15.

FIG. 15 is a fragmentary enlarged rear view of the second camera body 201 of the camera showing the junction portions, and FIG. 16 is a fragmentary cross-sectional view of the second camera body 201 taken along a line XVI—XVI in FIG. 15.

A first control circuit board 304 to which the magnetic head 202 is soldered is arranged behind the second camera body 201. The control circuit board 304 is a known flexible printed circuit board. This embodiment of the present invention also includes a second control circuit board 305 which is connected to other unshown units of the camera.

Mounted on the first control circuit board 304 is a CPU (not shown) for controlling generally controlling the camera including the magnetic head. The first control circuit board 304 is connected to the second control circuit board 305, and the units connected to the second control circuit board 305 are thus controlled by the CPU.

The first control circuit board 304 and second control circuit board 305 have interconnect pattern traces which can be connected at the junction portion 220a (see FIGS. 10 and 16). More particularly, the first control circuit board 304 and second control circuit board 305 are stacked on the junction portion 220a in the second camera body 201 as shown in FIG. 16. Since the interconnect pattern traces are formed on their meeting surfaces where both boards contact, an electrical connection is established.

Returning to FIG. 15, a rubber washer 302 and a metal washer 301 are stacked on the second control circuit board 305, and are then tightened onto the second camera body 201 by a securing screw 303. The rubber washer 302 is sufficiently thick enough to be pressed and contracted by the screw 303, and the electrical connection is not opened. Since the first control circuit board 304 and second control circuit board 305 are registered with the registering boss 221a of the second camera body 201, the interconnect pattern traces are prevented from coming off from each other.

The junction portions 220b, 220c and corresponding registering bosses 221b, 221c shown in FIG. 10 for other circuit boards work in the same way.

As described above, in the camera of this embodiment, the take-up spool compartment cover, pressure plate, and film cartridge compartment cover are integrated into a unitary structure, and the component count of the camera is reduced. Along with a small component count, the number of assembling steps and thus manufacturing cost are reduced.

According to the embodiment of the present invention, the take-up spool compartment cover, pressure plate, and film cartridge compartment cover are integrated into a unitary structure, the film spool compartment, film transport path and film cartridge compartment are shaded by two components of the camera body and the second camera body 201. This contributes to miniaturization of the camera.

According to the embodiment of the present invention, the second camera body 201 as a cover member, into which the take-up spool compartment cover, pressure plate, and film cartridge compartment cover are integrated, is connected to the camera body by screws. Thus, the camera of the present invention dispenses with the mechanism, needed in the prior art camera, for pressing the pressure plate to the camera body. The present invention thus results in a low-cost and miniature camera.

According to the embodiment of the present invention, the second camera body 201 as a cover member, into which the take-up spool compartment cover, pressure plate, and film cartridge compartment cover are integrated, is connected to the camera body, with the pressure plate secured to the camera body at four corners with screws.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A camera which allows a film cartridge to be loaded in a direction of an axis of rotation of the film cartridge comprising:

a camera body comprising a film cartridge compartment for accommodating a film cartridge, a film take-up spool compartment for taking up a film and a film transport path, formed between said compartments, and having a film frame aperture, and a shading cover comprising integral first, second and third shading sections, said first shading section which, when the shading cover is assembled to the camera body, forms, along with the film cartridge compartment, a shaded film cartridge compartment, the second shading section which, when the shading cover is assembled to the camera body, forms, along with the film take-up spool compartment, a shaded film take-up spool compartment, and the third shading section which, when the shading cover is assembled to the camera body, keeps the film, along the film transport path, in a plane perpendicular to an optical path while forming a shaded film passing space, and an outer covering member for covering the camera body and the shading cover.

2. A camera of a type that pays out a film from a loaded film cartridge comprising:

a camera body comprising a film cartridge compartment for accommodating the film cartridge, a film take-up spool compartment having a spool for taking up film paid out and a film frame aperture formed between the film cartridge compartment and the film take-up spool compartment, a shading cover, assembled to the camera body, for simultaneously shading the film cartridge compartment, the film take-up spool compartment, and a film transport path extending between the film cartridge compartment and the film take-up spool compartment, adjusting means arranged on at least one of the camera body and the shading cover, for adjusting a relative position of the camera body to the shading cover when assembled to the camera body, and fixing means for fixing the shading cover to the camera body to maintain a desired adjustment.

3. A camera according to claim 2, wherein the shading cover comprises integral first, second and third shading sections the first shading section which, when the shading cover is assembled to the camera body, cooperates with the film cartridge compartment to shade the film cartridge compartment, the second shading section which, when the shading cover is assembled to the camera body, cooperates with the film take-up spool compartment to shade the film take-up spool compartment, and a third shading section which, when assembled to the camera body, forms said film transport path and shades the film transport path.

4. A camera according to claim 3, wherein the adjusting means adjusts the position of the shading cover relative to the camera body so that the surface of the film passing along the film transport path lies in a plane parallel to an optical axis.

5. A camera of a type that pays out a film bearing a magnetic recording area from a loaded film cartridge comprising:

a first camera body comprising a film cartridge compartment for accommodating the film cartridge, a film take-up spool compartment having a spool for taking up the film paid out and a film frame aperture formed between the film cartridge compartment and the film take-up spool compartment, a second camera body integrally comprising integral first, second and third shading sections, the first shading section which, when the second camera body's assembled to the first camera body, shades the film cartridge compartment, the second shading section which, when the second camera body is assembled to the first camera body, shades the film take-up spool compartment, the third shading section which, when the second camera body is assembled to the first camera body, forms a film transport spacing along with a film transport path, and a magnetic head for recording magnetic information at least on a magnetic recording area in the film; and an outer covering for covering the first camera body and the shading cover.

6. A camera according to claim 5, wherein the third shading section which is integral with the first and second shading sections, is provided with film restraint means which keeps the film in a plane perpendicular to an optical axis by pressing film in a vicinity of the film frame aperture toward said aperture.

7. A camera according to claim 6 comprising a junction section for connecting first and second electric circuit boards, wherein the junction section is disposed on a side of the second camera body facing the first camera body, in a vicinity of the second shading section of the second camera body, the junction section having a surface for supporting first and second electronic circuit boards, an integral projection extending upwardly from said supporting surface and through-openings in said first and second circuit boards;

a resilient washer placed upon a top one of said first and second circuit boards;

a fastener secured to said projection for compressing said first and second circuit boards and said washer to assure good contact between engaging surfaces of the first and second circuit boards.

8. A camera according to claim 6, wherein the third shading section of the second camera body which is integral with the first and second shading sections, includes means which assures flatness of the film.

9. A camera according to claim 8, wherein the means which assures flatness of the film comprises a plurality of projections provided in the third shading section.

10. A camera according to claim 7 further comprising a registering boss adjacent to said projection and extending through registration openings in said first and second circuit boards to assure proper registration of the first and second circuit boards.

11. A camera according to claim 10 wherein one of said first and second circuit boards is a flexible printed circuit.

12. A camera which allows a film cartridge to be loaded in a direction of an axis of rotation of the film cartridge, comprising:

a camera body comprising a film cartridge compartment for accommodating a film cartridge, a film take-up spool compartment for taking up a film and a film transport path, formed between said compartments, and having a film frame aperture, and a shading cover having film restraint means for maintaining the film in a plane perpendicular to an optical axis by pressing the film in a vicinity of the film frame aperture and, when assembled to the camera body, substantially simultaneously shades the film cartridge compartment, the film take-up spool compartment, and the film frame aperture, and an outer covering member for covering the camera body and the shading cover.

* * * * *